United States Patent
Adams

(10) Patent No.: US 7,653,766 B1
(45) Date of Patent: *Jan. 26, 2010

(54) TIME-GAP DEFECT DETECTION APPARATUS AND METHOD

(76) Inventor: Philip M. Adams, 313 Pleasant Summit Dr., Henderson, NV (US) 89012

( * ) Notice: Subject to any disclaimer, the term of this patent is extended or adjusted under 35 U.S.C. 154(b) by 0 days.

This patent is subject to a terminal disclaimer.

(21) Appl. No.: 12/108,363

(22) Filed: Apr. 23, 2008

Related U.S. Application Data

(63) Continuation of application No. 11/009,961, filed on Dec. 10, 2004, now Pat. No. 7,366,804, which is a continuation of application No. 10/005,135, filed on Nov. 30, 2001, now Pat. No. 6,842,802.

(51) Int. Cl.
    G06F 3/00      (2006.01)
    G06F 11/00     (2006.01)
(52) U.S. Cl. .................. 710/57; 710/15; 710/53; 710/56; 714/47; 714/48
(58) Field of Classification Search .............. None
    See application file for complete search history.

(56) References Cited

U.S. PATENT DOCUMENTS

| | | | |
|---|---|---|---|
| 3,908,099 | A | 9/1975 | Borbas et al. |
| 4,040,027 | A | 8/1977 | van Es et al. |
| 4,189,765 | A | 2/1980 | Kotalik et al. |
| 4,206,440 | A | 6/1980 | Doi et al. |
| 4,216,532 | A | 8/1980 | Garetti et al. |
| 4,459,661 | A | 7/1984 | Kaneda et al. |
| 4,589,063 | A | 5/1986 | Shah et al. |
| 4,654,783 | A | 3/1987 | Veres et al. |
| 4,727,480 | A | 2/1988 | Albright et al. |
| 4,779,187 | A | 10/1988 | Letwin |
| 4,888,680 | A | 12/1989 | Sander et al. |
| 4,942,606 | A | 7/1990 | Kaiser et al. |
| 4,996,690 | A | 2/1991 | George et al. |
| 5,093,910 | A | 3/1992 | Tulpule et al. |
| 5,179,663 | A | 1/1993 | Iimura |
| 5,212,795 | A | 5/1993 | Hendry |
| 5,233,692 | A | 8/1993 | Gajjar et al. |
| 5,237,567 | A | 8/1993 | Nay et al. |
| 5,267,241 | A | 11/1993 | Kowal |

(Continued)

OTHER PUBLICATIONS

NEC Electronics, Inc., "IBM-NEC Meeting for μPD765A/μPD72065 Problem" (U.S.A., May 1987).

Intel Corporation, Letter to customers from Jim Sleezer, Product Manager, regarding FDC error and possible solutions (U.S.A., May 2, 1988).

Adams, Philip M., Nova University, Department of Computer Science, "*Hardware-Induced Data Virus,*" Technical Report TR-881101-1 (U.S.A., Nov. 14, 1988).

(Continued)

*Primary Examiner*—Alan Chen
(74) *Attorney, Agent, or Firm*—Pate Pierce & Baird

(57) ABSTRACT

A programmatic time-gap defect correction apparatus and method corrects errors which may go undetected by a computer system. Buffer underruns or overruns, which may incur errors in data transfers, yet remain undetected and uncorrected in a computer system, are corrected by an error avoidance module in accordance with the invention. Bytes transferred to and from buffers, used by an I/O controllers to temporarily store data while being transferred between synchronous and asynchronous devices, are counted and an error condition is forced based on the count. If the count exceeds the capacity of the buffer, an error condition is forced, thereby reducing chances that errors are incurred into the data transfer.

19 Claims, 9 Drawing Sheets

U.S. PATENT DOCUMENTS

| | | |
|---|---|---|
| 5,379,414 A | 1/1995 | Adams |
| 5,416,782 A | 5/1995 | Wells et al. |
| 5,422,892 A | 6/1995 | Hii et al. |
| 5,450,546 A | 9/1995 | Krakirian |
| 5,619,642 A | 4/1997 | Nielson et al. |
| 5,983,002 A | 11/1999 | Adams |
| 6,151,180 A | 11/2000 | Bang |
| 6,842,802 B2 | 1/2005 | Adams |
| 6,948,185 B1 * | 9/2005 | Chapel et al. ............... 725/139 |

OTHER PUBLICATIONS

Advanced Military Computing, "*Hardware Virus Threatens Databases,*" vol. 4, No. 25, pp. 1 & 8 (U.S.A., Dec. 5, 1988).

Intel Corporation, "*8237A/8237A-5 High Performance Programmable DMA Controller,*"(U.S.A., date unknown).

Intel Corporation, "*82724 Single/Double Density Floppy Disk Controller*" (U.S.A., date unknown).

\* cited by examiner

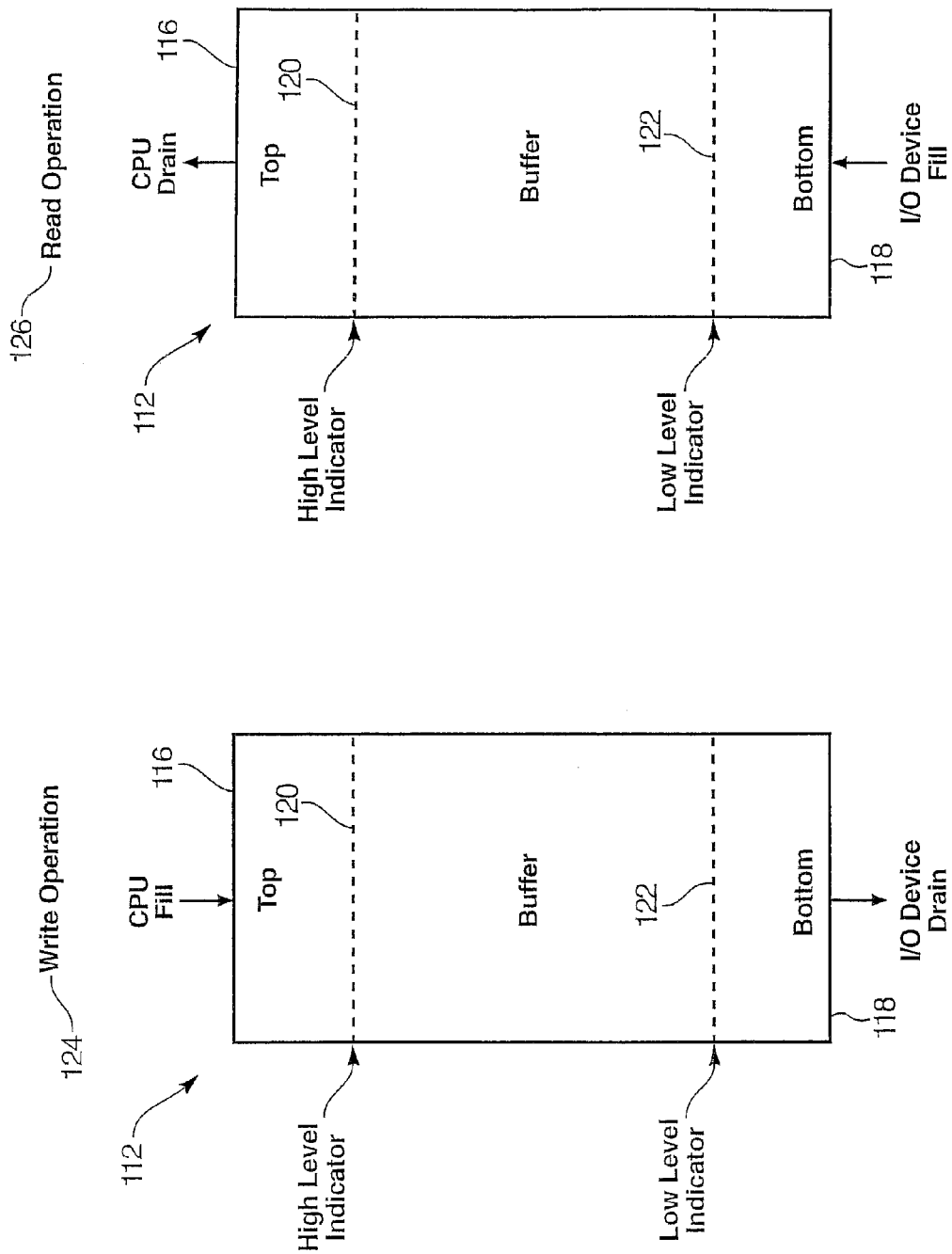

TIME-GAP DEFECT DETECTION APPARATUS AND METHOD

RELATED APPLICATIONS

This application is a continuation of U.S. patent application Ser. No. 11/009,961 filed Dec. 10, 2004 which is a continuation of U.S. patent application Ser. No. 10/005,135 filed Nov. 30, 2001.

BACKGROUND

1. The Field of the Invention

This invention relates to computer systems and, more particularly, to novel systems and methods for preventing data corruption due to time-gap defects in computer systems.

2. The Background Art

Computers are now used to perform functions and maintain data critical to many organizations. Businesses use computers to maintain essential financial and other business data. Computers are also used by government to monitor, regulate, and even activate, national defense systems. Maintaining the integrity of the stored data is essential to the proper functioning of these computer systems, and data corruption can have serious (even life-threatening) consequences.

Computers store information in the form of numerical values, or data. Information represented as data may take many forms including a letter or character in an electronic document, a bank account number, an instruction executable by a processor, operational values used by software, or the like. Data may be stored permanently in long-term memory devices or may be stored temporarily, such as in a random access memory. Data may flow between devices, over networks, through the Internet, be transmitted wirelessly, and the like.

Data may be changed or overwritten in many cases, such as when an account balance or date is automatically updated. However, computer users expect a computer system not to make inadvertent or incorrect changes to data, compromising its integrity. When these inadvertent or erroneous changes do occur, data corruption is incurred. The causes of data corruption may be numerous, including electronic noise, defects in physical hardware, hardware design errors, and software design errors.

Hardware design flaws may result from oversights or inaccuracies in specifying timing, function, or requirements for interfacing with other hardware in a circuit or computer system. Computer system hardware designers may build a certain amount of design margin into a system to allow for voltages to settle, signal rise and fall times, and the like. Specifications usually provide margins and limits. If insufficient design margin is provided or timing errors cause signals to be read at incorrect times, data corruption may result. Thus, even when data may be stored correctly in memory devices or calculations are performed correctly by a processor, data may be corrupted when transferred between hardware devices due to timing inconsistencies or insufficient design margin.

Different approaches may be used to reduce or eliminate data corruption. One approach may be to prevent data corruption from happening in the first place. This may be accomplished, in part, by improving the quality and design of hardware and software systems. Data is transmitted and manipulated by myriad different hardware components in a computer system including buses, controllers, processors, memory devices, input and output devices, cables and wires, and the like. Software may contain glitches or logical flaws. Each one of these hardware components or software applications is a possible candidate for incurring data corruption.

Another approach is to build error detecting and correcting capabilities into the hardware and software systems. Error correction such as parity checking, redundant systems, and validity checking can help to detect and correct data corruption.

In certain hardware systems, time gaps may exist in which erroneous data transfers between devices may occur, yet remain undetected by the hardware involved. Specifications for controllers or other devices in a computer system may have very rigorous time requirements stating when error processing may actually detect and report an error or not. There may not be an absolute time, but there may be an absolute time plus or minus a tolerance, where the tolerance value may be very small. This value may determine time gaps where errors may go undetected by a device. Detecting these time gaps in hardware systems may be critical in order to identify possible sources of data corruption due to faulty hardware design.

In some cases, occurrences of data corruption may be exacerbated by the arbitration that occurs between devices in a computer system. That is, because of the increase in handshaking, exchanges, and buffering that occurs between devices in a computer system, conditions may exist wherein errors may be incurred, yet remained undetected to the computer system. For example, clock speeds continue to increase in computer systems. In addition, expansion buses and ports, which may use different clocks speeds, are being added to facilitate the use of new input and output devices.

As a result, a computer system may increase in complexity due to increases in arbitration needed to pass information between the buses, ports, devices, bridges, and the like. Additionally, computer designers may design a computer system to be backward compatible with older and slower devices, but may provide insufficient error correction support for these devices in order not to slow overall system performance. One problem may be that a CPU actually sends or requests data before a controller can instruct it not to do so. The result is that data may be lost and in some cases may go undetected to the hardware involved in the data transfer. These types of problems may increase in frequency and number as newer and faster devices are interfaced to older legacy controllers and devices.

Input and output controllers within a computer system are responsible for arbitrating data exchanges between asynchronous devices, such as a CPU, and synchronous input or output devices, such as hard drives, floppy drives, CD-ROMs, and the like. Controllers dedicated to correctly effectuating these exchanges increase the efficiency of a computer system by reducing the amount of time and resources that devices such as a CPU would otherwise have to dedicate. Since a CPU may output data in bursts, as compared to an input or output device which may read or write information at consistent intervals, such as to rotating media, buffers may be used by the input or output controllers to temporarily store data.

Buffer underruns and overruns may occur when data is not provided to or read from a buffer quickly enough and may incur errors in a data transfer. As a result, errant values may be incorrectly read from an empty buffer or data may be lost when the buffer is overrun. Buffer underrun or overrun flags may be set to interrupt the devices involved in such a situation so that error correction capabilities may be invoked. However, if time-gap defects exist between I/O controllers and other devices in a computer system, interrupts may not arrive within the necessary time-frame to be properly responded to.

Thus, proper timing of error detection and correction processes are critical to avoid data corruption and ensure that devices function properly.

BRIEF SUMMARY AND OBJECTS OF THE INVENTION

In view of the foregoing, it is desirable to provide an error avoidance module to avoid errors incurred by time-gap defects in a computer system.

It may also be desirable, independently or in concert, to prevent errors incurred in data transfers due to buffer underruns and overruns occurring in I/O controllers in a computer system.

In certain circumstances, it may be beneficial to provide an error avoidance module that may avoid errors incurred by time-gap defects, simply and while occupying minimal system resources.

Consistent with the foregoing needs, and in accordance with the invention as embodied and broadly described herein, a method and apparatus are disclosed in one embodiment in accordance with the invention as including a memory device configured to store data structures including executables and operational data, and a processor for processing the data structures.

One embodiment of an apparatus in accordance with the invention may include a controller configured to control an exchange of data between devices in a computer system. The controller may include a buffer, such as a FIFO, register, or the like, having a capacity in terms of bytes, which is configured to temporarily store the data. A driver may be configured to control the operation of the controller and invoke an interrupt service routine when an interrupt, such as the completion of a read or write operation, or an error, occurs. An error avoidance module in accordance with the present invention may be added to the interrupt service routine in order to count the number of bytes transferred with respect to the buffer during the exchange of data. Based on that count, an error condition may be forced.

For example, in certain embodiments, the error condition may be forced if the value of the count is at least as large as the capacity of the buffer, accounting for the possibility that a buffer overrun occurred and went undetected. In other embodiments, the error condition may be forced if the value of the count is at least as large as the capacity of the buffer plus some value corresponding to bytes transferred both in and out during a transfer. This value may be calculated using the rate at which data is being removed from (or inserted into) the buffer by a hardware device, such as a CD-ROM or hard drive.

An initialization module may be added to the initialization functions of the controller driver in order to enable the error avoidance module. The initialization module may enable content-limiting interrupts configured to occur when the content of the buffer approaches a limiting capacity. For example, the content-limiting interrupts may occur when the buffer is almost full or nearly empty in order to instruct the CPU to terminate sending or requesting data in order to avoid buffer underruns or overruns.

Consequently, the content-limiting interrupts may trigger the execution of an interrupt service routine. A test may then be performed to determine if the interrupt is a content-limiting interrupt. If the interrupt is a content-limiting interrupt, the error avoidance module may then begin to count the number of bytes transferred with respect to the buffer. The execution module may first set the transfer count to zero and clear any overrun or underrun flags.

Then, a test may be performed to determine if the transfer operation is a read or write operation. If the data transfer is a read operation, the error avoidance module may verify that data is available and then read a byte of data to the buffer. If the transfer is a write operation, the error avoidance module may verify that data is requested and write a byte of data from the buffer. After a byte is either read or written, the transfer count may be incremented and a test may be repeated to determine if data is either available, in the case of a read operation, or requested, in the case of a write operation.

If data is no longer available, in the case of a read operation, or if data is no longer requested, in the case of a write operation, the current value of the transfer count may be compared to the capacity of the buffer. If the total number of bytes transferred is greater than the buffer capacity, then a buffer underrun or overrun may have occurred, an error condition is forced, and error correction procedures may be performed. If the transfer count is less than the capacity of the buffer, then the error avoidance module may complete the operation without forcing an error condition and the interrupt service routine returns from the interrupt. The measurement (count) to determine emptiness or fullness of the buffer may be adjusted by an amount to reflect additional bytes transferred both in and out, or both out and in, during a transfer operation.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings in which:

FIG. 6 is a schematic block diagram illustrating the function of a buffer during a write operation;

FIG. 7 is a schematic block diagram illustrating the function of a buffer during a read operation;

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of systems and methods in accordance with the present invention, as represented in FIGS. 1 through 10, is not intended to limit the scope of the invention, as claimed, but is merely representative of certain presently preferred embodiments in accordance with the invention.

The presently preferred embodiments will be best understood by reference to the drawings, wherein like parts are designated by like numerals throughout.

Figure 1:
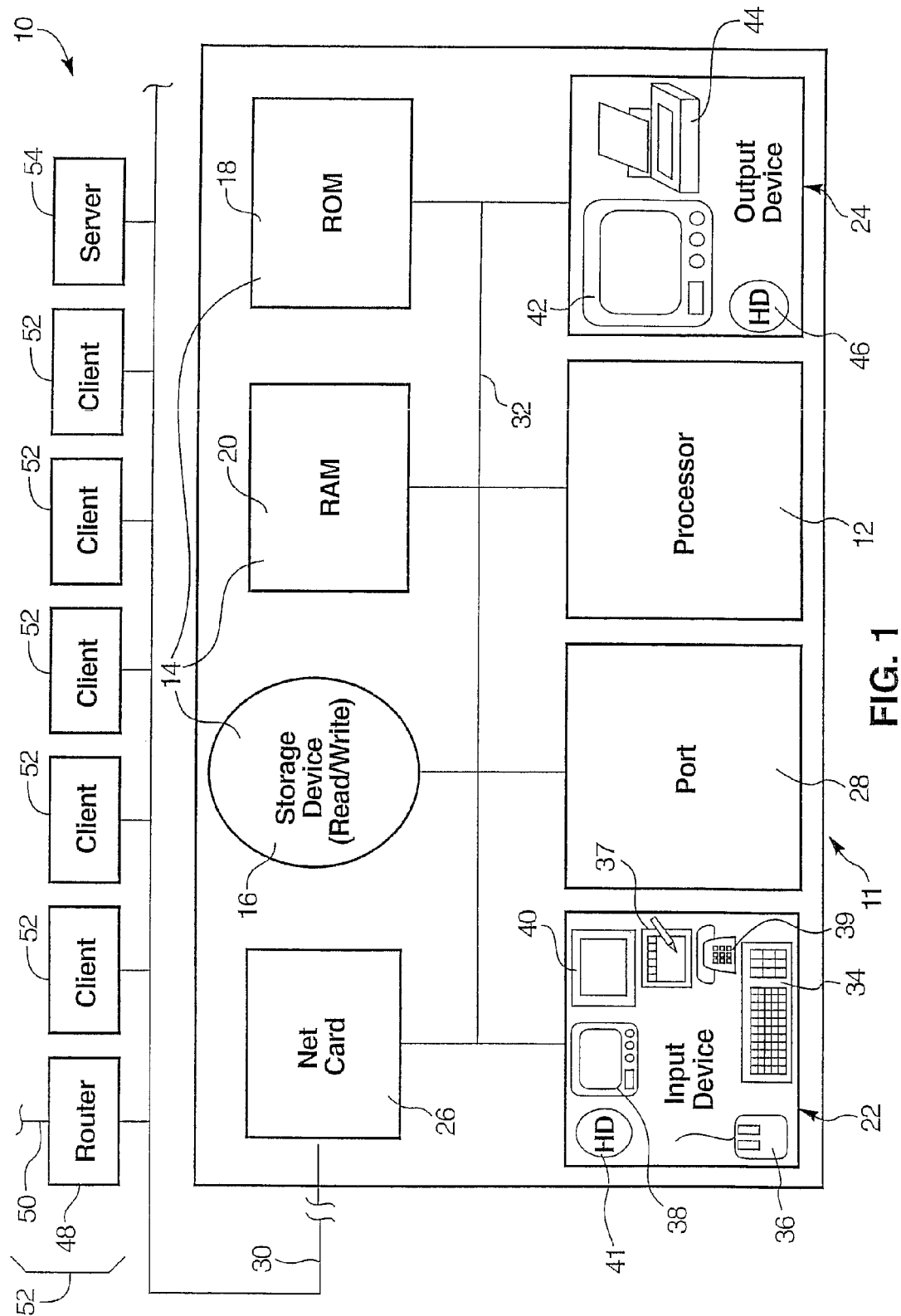
FIG. 1 is schematic block diagram of a computer system in accordance with the invention.

Referring to FIG. 1, an apparatus 10 may implement the invention on one or more nodes 11, (client 11, computer 11) containing a processor 12 (CPU 12). All components may exist in a single node 11 or may exist in multiple nodes 11, 52 remote from one another. The CPU 12 may be operably connected to a memory device 14. A memory device 14 may include one or more devices such as a hard drive or other non-volatile storage device 16, a read-only memory 18 (ROM) and a random access (and usually volatile) memory 20 (RAM/operational memory).

The apparatus 10 may include an input device 22 for receiving inputs from a user or from another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36 or stylus pad. A touch screen 38, a telephone 39, or simply a telecommunications line 39, may be used for communication with other devices, with a user, or the like. Similarly, a scanner 40 may be used to receive graphical inputs, which may or may not be translated to other formats. The hard drive 41 or other memory device 41 may be used as an input device whether resident within the node 11 or some other node 52 (e.g. 52, 54, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44, a hard drive 46, or other device may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 48, 52, 54) may have various communication capabilities.

In certain embodiments, a minimum of logical capability may be available in any node 52. Note that any of the individual nodes 11, 48, 52, 54 may be referred to, as may all together, as a node 11 or a node 52. Each may contain a processor 12 with more or less of the other components 14-44.

A network 30 may include one or more servers 54. Servers may be used to manage, store, communicate, transfer, access, update, and the like, any practical number of files, databases, or the like for other nodes 52 on a network 30. Typically, a server 54 may be accessed by all nodes 11, 52 on a network 30. Nevertheless, other special functions, including communications, applications, directory services, and the like, may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12-46 may need to communicate data with one another. A communication link may exist, in general, between any pair of devices.

Figure 2:
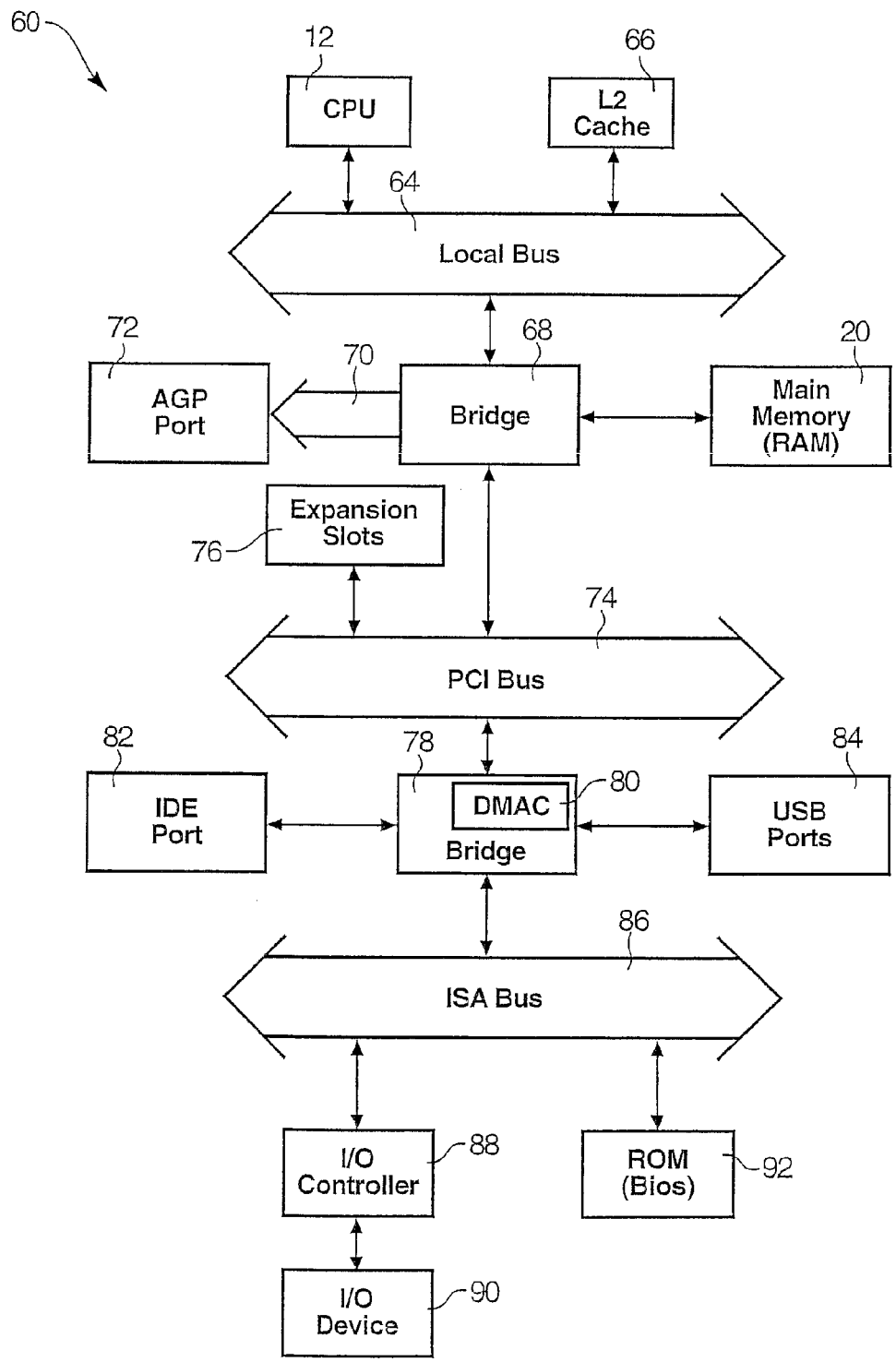
FIG. 2 is a schematic block diagram illustrating a hierarchy of buses and devices in a computer system.

Referring to FIG. 2, a bus hierarchy 60 may include a plurality of buses 64, 74, 86, linked together by bridges 68, 78. This example of a bus hierarchy 60 is only one example of many possible arrangements that may be present in a computer system and is simply used to illustrate the arbitration that occurs between device and buses in a computer system. A local bus 64 may have a very fast data throughput, although it may support very few devices, such as, for example, a processor 12 and level-2 cache, in order to achieve a high level of performance. A bridge 68 may be operably connected to the bus 64 and may arbitrate exchanges of data between the bus 64, main memory (RAM) 20, an AGP bus 70 and a port 72, and an expansion bus 74, such as a PCI bus 74. The bridge 68 may also contain buffers used to reconcile differences in clock speeds between the PCI bus 74 and the local bus 64.

The PCI bus 74 may be configured to accept hardware devices into any of several expansion slots 76. Another bridge 78 may be operably connected to the PCI bus 74 and be configured to interface with slower legacy buses, such as an ISA bus 86. In addition, the bridge 78 may interface to IDE ports 82, such as are used to connect to hard drives, and other ports 84, such as USB ports 84. The bridge 78 may also include a direct memory access controller (DMAC) 80 to facilitate data exchange directly between any of the devices in the computer system and main memory 20, thereby conserving the resources of the processor 12.

The ISA bus 86, which may operate at a comparatively slower clock speed than the PCI bus 74 or the local bus 64, may be connected to a ROM 92, which may contain a system BIOS 92, and be connected to any number of I/O controllers 88 used to control I/O devices 90. The ISA bus 86 may operate asynchronously, while the I/O device 90 may operate synchronously. Therefore, the I/O controller 88 may provide an interface, thereby allowing the I/O device 90 and the bus 86 to transfer data therebetween.

A principal responsibility of the bridges 68, 78 and the I/O controller 88 is to act as arbitrators of data transmitted between the buses 64, 74, 86 and I/O devices 90, which may operate with different data rates, bus widths, protocols, and the like. Therefore, data flowing from a CPU 12 to an I/O device 90 may have to pass through myriad different components (i.e. buses, bridges, etc.) in order to reach its final destination. Each "handoff" or data transfer that occurs while data is flowing from device to bus, bus to bridge, bridge to bus, bus to I/O controller, and so forth, increases the chance that errors may be introduced into the data. In addition, as newer, faster devices are interfaced with slower legacy controllers and devices, timing inconsistencies may unknowingly create "time-gap" defects wherein error detection and correction capabilities do not function as intended.

Figure 3:
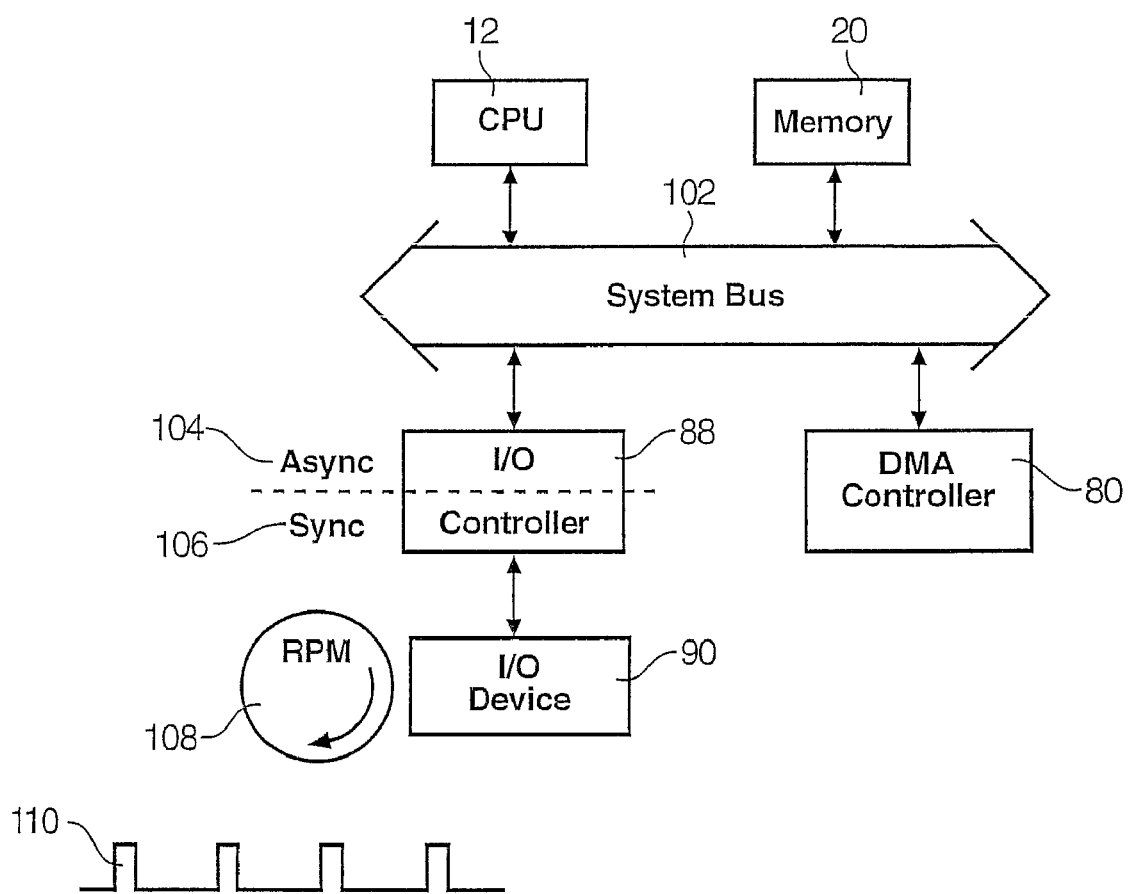
FIG. 3 is a simplified schematic block diagram of a computer system illustrating a role of an I/O controller in relation to a CPU and an I/O device.

Referring to FIG. 3, a simplified schematic block diagram of a computer system 10 may be represented by a system bus 102 hosting a CPU 12, main memory (RAM) 20, an I/O controller 88, and a direct memory access controller (DMAC) 80. The controller 88 may be represented by an asynchronous portion 104 and a synchronous portion 106. An asynchronous portion 104 may interface with the bus 102 and be responsible for orchestrating data exchanges between the controller 88 and the CPU 12, which may operate in an asynchronous manner. A synchronous portion 106 may interface with the I/O device 90 which may operate in a synchronous manner.

For example, an I/O device 90 may have a fixed clock 110 and read and write operations may need to occur at each clock pulse 110 in order for an operation to be completed successfully. Therefore, data may need to be made available to the I/O device 90 at each clock pulse 110 or an error may be incurred. For example, certain rotating media 108, such as hard drives 41, may rotate at a fixed RPM and require that data be read or written at specific timing intervals.

The asynchronous portion 104 of the controller 88 may be responsible for the coordination needed to exchange data over the system bus 102 but may be incapable of asserting control of the I/O device 90. Likewise, the synchronous portion 106 may coordinate synchronous read and write operations with the I/O device 90, but may be incapable of asserting control over the system bus 102, since doing so may compromise the performance of the bus 102 and the CPU 12. Thus, the CPU 12 may optimize its resources and not be required to respond to an I/O device 90 each time a read or write operation is executed.

Figure 4:
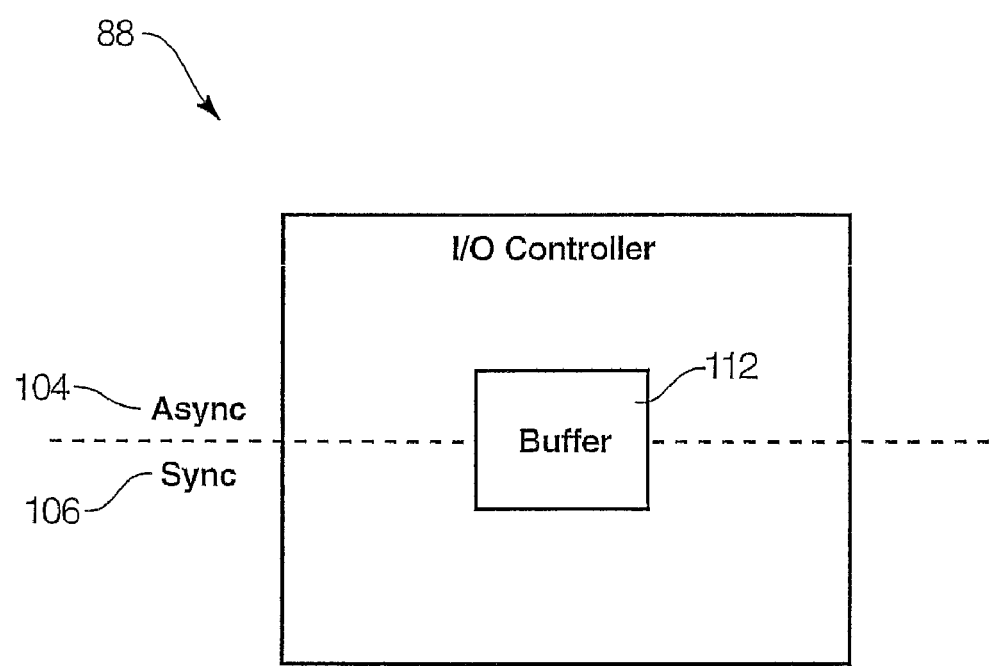
FIG. 4 is a schematic block diagram of an I/O controller and an internal buffer.

Referring to FIG. 4, a buffer 112 may be included in the I/O controller 88 to temporarily store data received from one of the portions 104, 106 while being processed by the other portion 104, 106 of the controller 88. In this way, one portion 104, 106 of the controller 88 may continue operation without being held up by the other 104, 106. Similar to a cache, a buffer may help coordinate the completion of different activities.

However, despite the utility of buffers in coordinating synchronous and asynchronous activities, buffer underruns and overruns may occur, thereby incurring errors in data transfers. For example, a buffer underrun may occur when data is not supplied quickly enough to a buffer in order to be written out to a synchronous device. In this scenario, an empty location may be mistaken for a location storing a value of zero.

As faster synchronous devices are developed, such as those using FDDI (Fiber Distributed Data Interface) or Firewire, buffer underruns may occur more frequently because of the high data throughput required, with which other devices cannot keep pace. Nevertheless, buffer underrun and overrun errors may occur in legacy devices as well, including, for example, controllers and other devices associated with comparatively slower floppy disk drives. In other instances, several devices may compete for the time and resources of a CPU 12, thereby preventing the CPU 12 from supplying data to a buffer 112 at a sufficient rate.

Similarly, buffer overruns may occur when data is supplied to the buffer faster than it can be periodically removed. "Spill over" may occur, by which data may be accidentally overwritten prematurely in the buffer before being transferred to its destination, resulting in possible data loss. It is therefore important that a system be able to detect, correct, or otherwise avoid buffer underruns and overruns in order to prevent possible data corruption. If time gaps exist where buffer underruns or overruns occur, but remain undetected by a computer system, data corruption may result.

Figure 5:
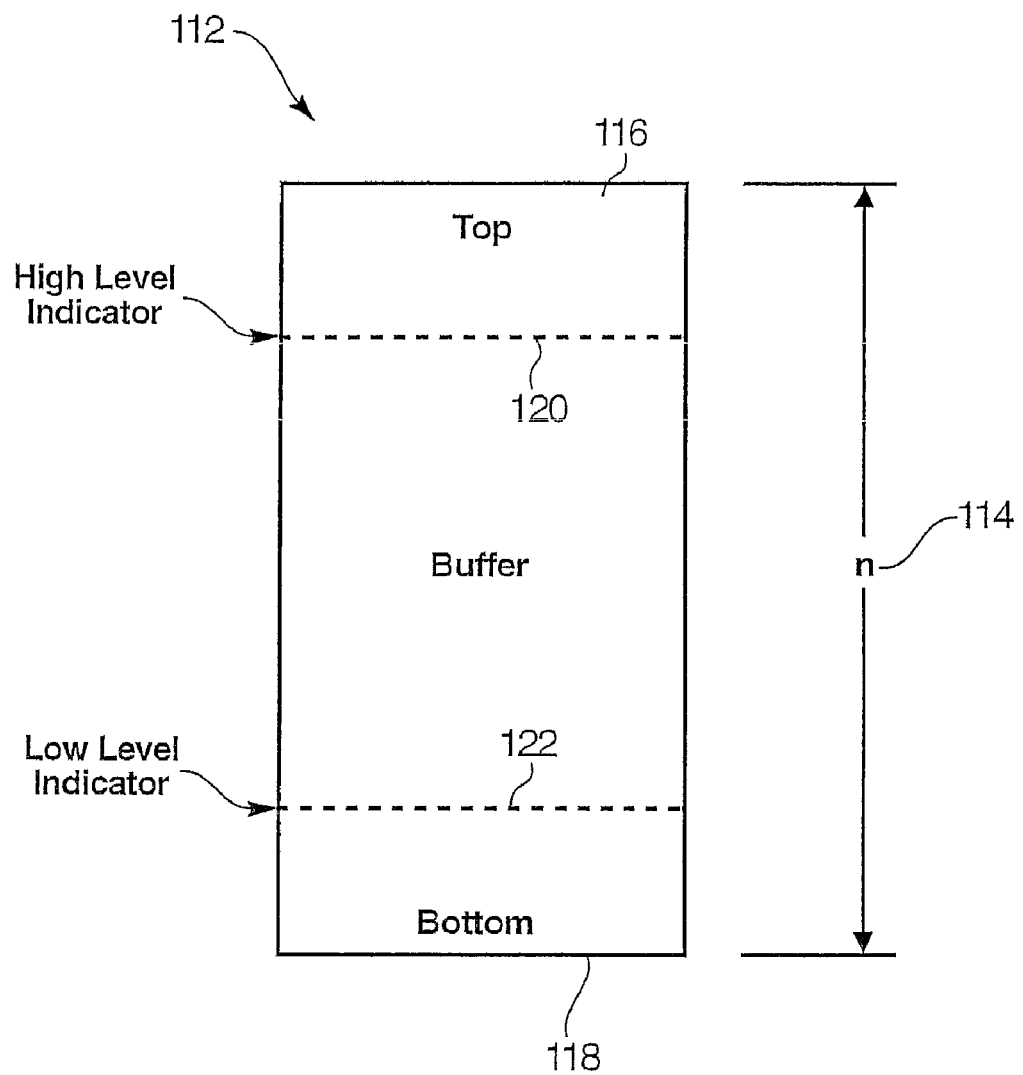
FIG. 5 is a schematic block diagram of a buffer illustrating high and low level indicators and buffer size.

Referring to FIG. 5, in order to solve the dilemma wherein buffer underruns and overruns may incur errors that remain undetected by a computer system, a buffer 112, having a capacity of n bytes 114, may be configured with a high level indicator 120 (e.g. limit, datum, flag, etc.) and a low level indicator 122. A high level indicator 120 may serve as a warning indicator 120 that the content in a buffer is approaching its maximum capacity 116. The indicator 120 may initiate, trigger, or otherwise produce an interrupt to inform the CPU 12 to begin removing data from the buffer before an overrun occurs. The I/O controller 88 is prevented from sending more (e.g. too much) data to the buffer 112.

Similarly, the low level indicator 122 may serve as a warning indicator 122 that the buffer content is approaching its minimum capacity 118 and be used to produce an interrupt notifying the CPU 12 that the device 90 needs more data (buffer must be filled).

The location of the level indicators 120, 122 may be adjusted with respect to the buffer according to the time needed by the CPU 12 to respond to requests to fill or empty the buffer. For example, a CPU 12 may require a certain time period to respond due to interrupt latency. Other factors, such as bus arbitration delays and the like may be used to determine the time needed for devices to respond to signals received from the I/O controller 88 (buffer 112).

For example, referring to FIGS. 6 and 7, during a write operation 124, an I/O device 90 may drain the buffer 112. When the content of the buffer 112 reaches a low level, a low level indicator 122 may initiate or generate an interrupt to notify the CPU 12 to begin filling the buffer 112. The CPU 12 may continue filling the buffer 112 until the buffer content reaches a high level indicator 120, or the buffer's capacity, which may likewise initiate or otherwise generate a signal to notify the CPU 12 to stop filling the buffer 112 (e.g. to avoid an overrun).

Conversely, during a read operation 126, the CPU 12 may drain the buffer 112 and an I/O device 90 may fill the buffer 112. When the content of the buffer 112 reaches a high level indicator 120, an interrupt may be generated to begin draining by the CPU 12. Once the CPU 12 has drained the buffer, the CPU 12 ceases to obtain data from the buffer 112. Thus, the high and low level indicators 120, 122 and their corresponding interrupts may serve to reduce buffer underruns and overruns.

Figure 8:
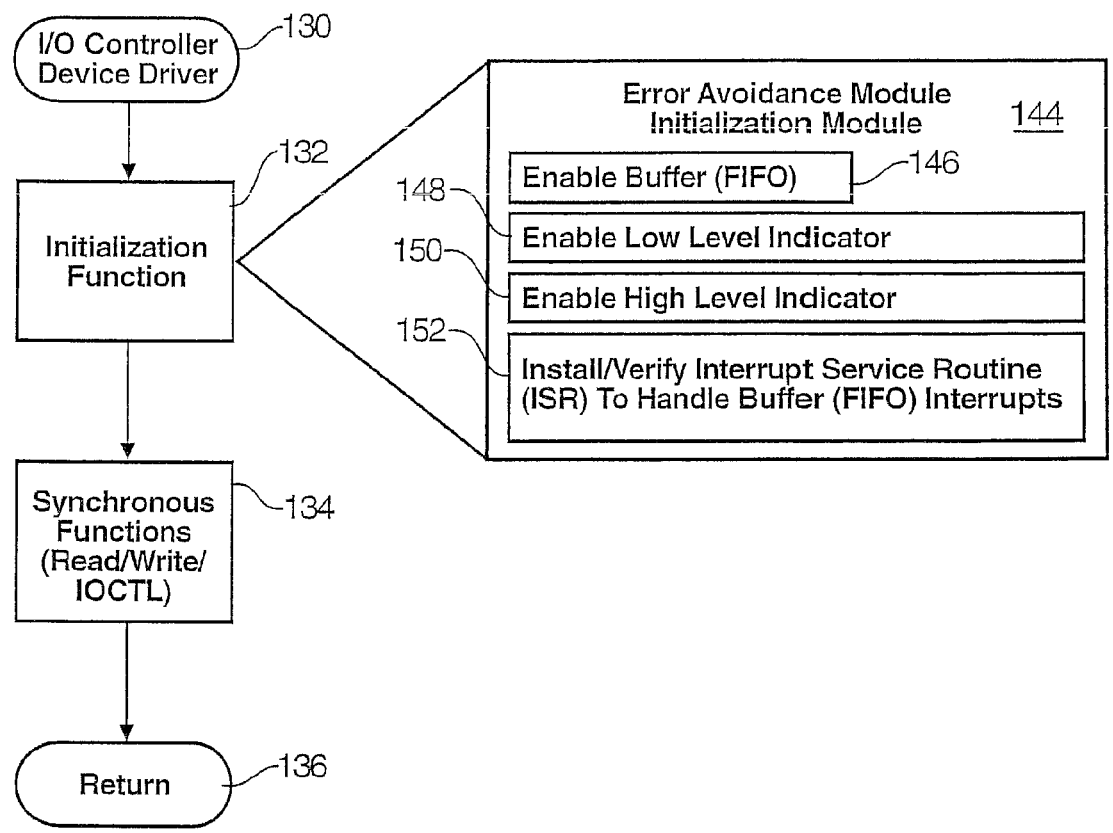
FIG. 8 is a schematic block diagram of an initialization module that may be added to provide other initialization functions for the I/O controller device driver to initialize the error avoidance module.
Figure 9:
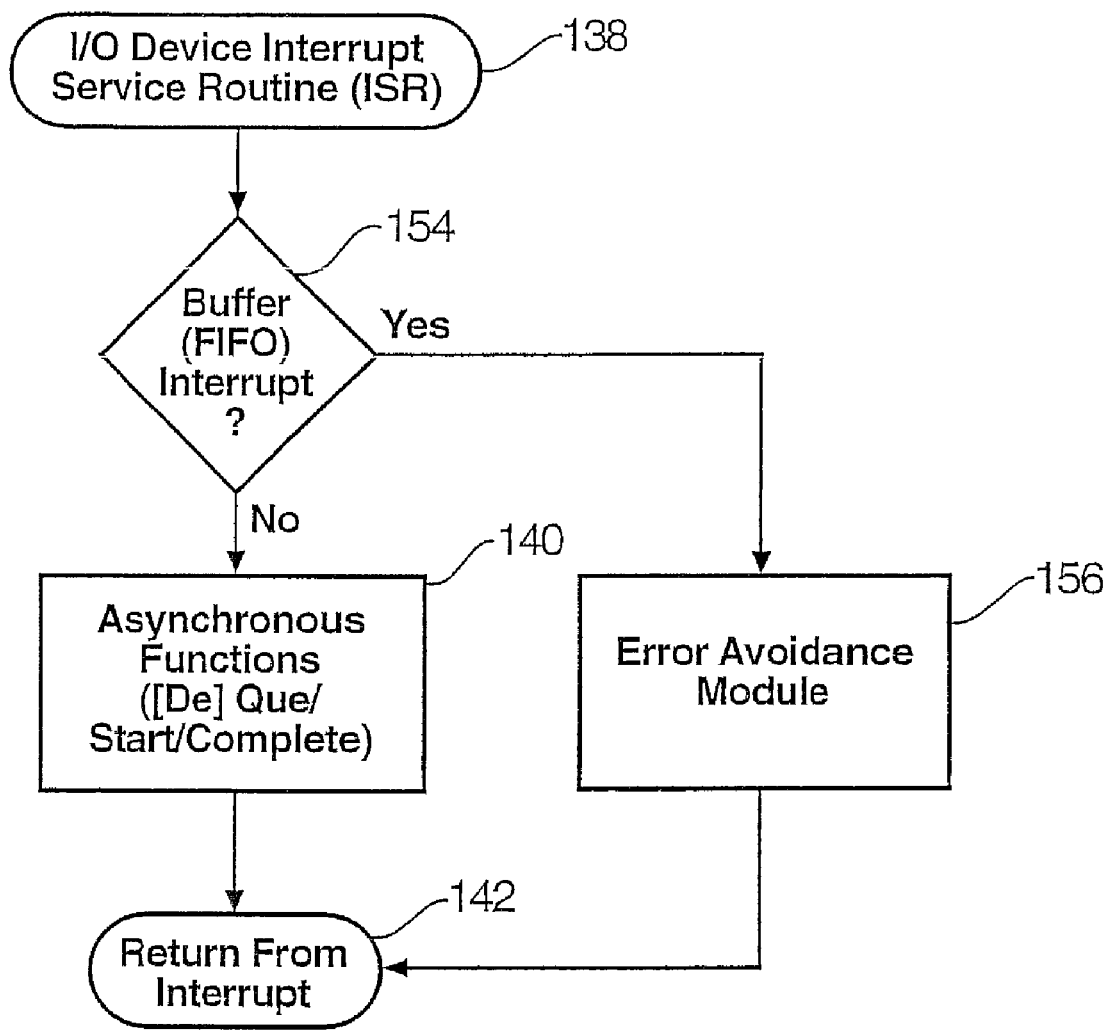
FIG. 9 is a schematic block diagram illustrating one embodiment integrating the algorithm of the error avoidance module into the interrupt service routine.

Referring to FIGS. 8 and 9, an I/O device driver architecture 130 may include an initialization function 132 and synchronous functions 134 used to control a synchronous I/O device 90. The initialization function 132 may initialize any interrupts that the I/O controller 88 may generate in response to conditions such as I/O completion, transfer errors, or the like. In addition, the initialization function 132 may install an interrupt service routine 138 to be executed when an interrupt occurs. The interrupt service routine 138 may then execute asynchronous functions 140 corresponding to the CPU 12 or other asynchronous devices. Once the interrupt service routine 138 responds to an interrupt, control may be returned 142 back to the point of execution interruption.

An apparatus and method 10 in accordance with the invention may be implemented by adding an initialization module 144 to the initialization function 132 of the device driver 130. For example, an initialization module 144 may enable 146 the FIFO 112 or buffer 112. Enabling 148, 150 a low level indicator 122 and a high level indicator 120 may also be added to enable and specify the triggering points of the high and low level indicators 120, 122. Finally the interrupt service routine 138 may be modified and enabled 152 to handle the FIFO 146 or buffer interrupts 146 and the high and low level indicator interrupts 148, 150.

The interrupt service routine 138 may be modified by introducing a test 154 before executing the asynchronous functions module 140. The test 154 may determine 154 if the interrupt is a FIFO or buffer interrupt 148, 150 or some other type of interrupt. If the interrupt is a FIFO or buffer interrupt 148, 150 (e.g. one of the high or low level indicator interrupts, as previously discussed), an error avoidance module 156 may be executed. The error avoidance module 156 may be executed 156 to prevent any buffer overrun or underrun errors from occurring due to time-gap defects in the computer system. Once the error avoidance module 156 is completed, the interrupt service routine 138 may complete and return 142.

If the test 154 determines that the interrupt is one other than a FIFO or buffer interrupt 148, 150, then the asynchronous functions module 140 may be executed as normal and the interrupt service routine 138 may return 142.

Figure 10:
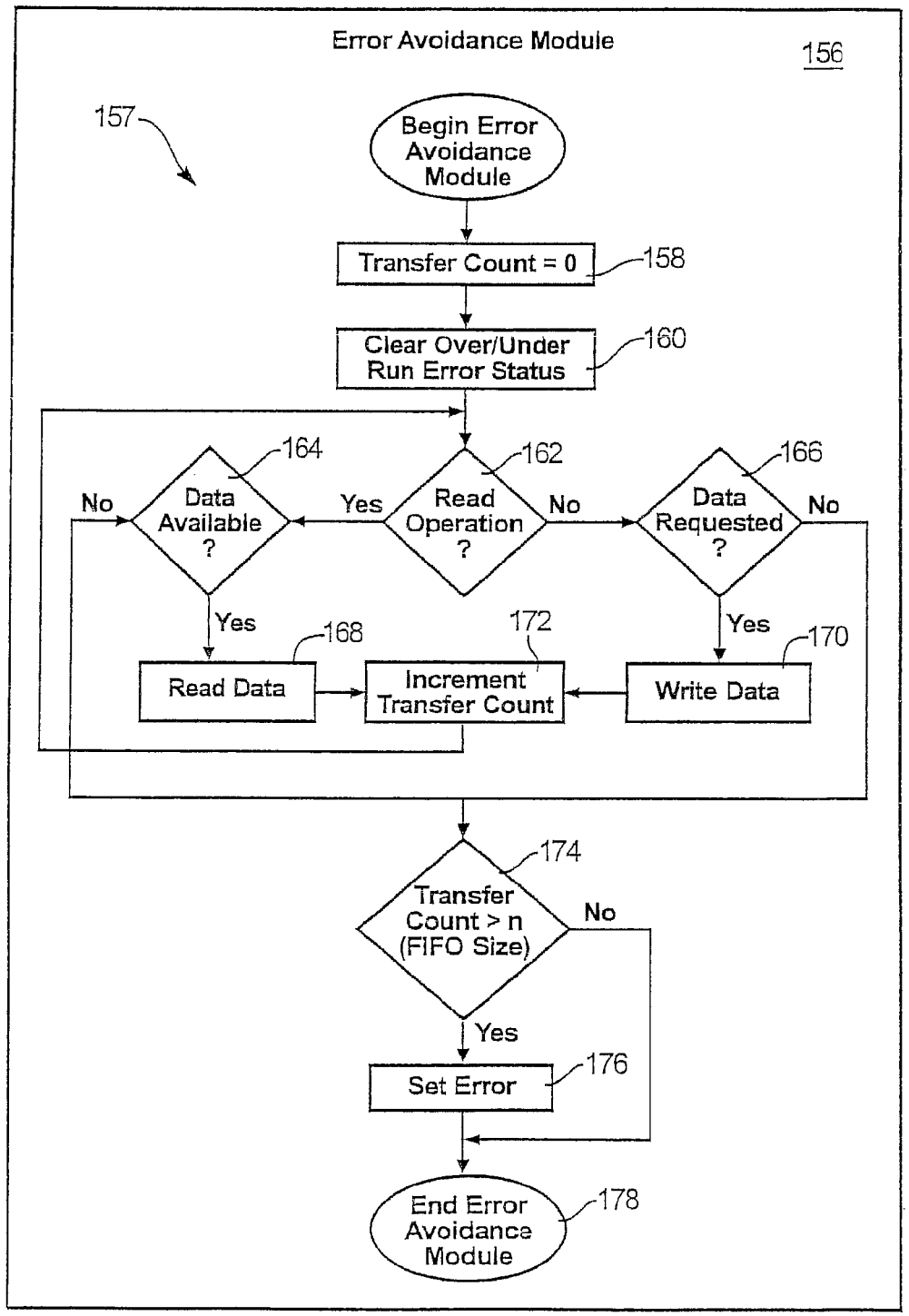
FIG. 10 is a schematic block diagram illustrating one embodiment of an algorithm that may be followed by the error avoidance module.

Referring to FIG. 10, the error avoidance module 156 may follow a process 157 or algorithm 157. This process 157 may be used to count the number of bytes transferred to or from the buffer 112. If the number of bytes transferred to or from the buffer 112 exceeds the capacity of the buffer, then the error avoidance module 156 may conclude that a buffer underrun or overrun condition may have occurred. Thus, an error may have occurred, yet remained undetected by the computer system, and an error condition may need to be forced by the error avoidance module 156.

In some embodiments, the error avoidance module 156 may force an error condition when the number of bytes transferred with respect to the buffer 112 is greater than the capacity of the buffer plus some dynamic capacity. This dynamic capacity may be calculated by dividing the total time used to transfer the data with respect to the buffer 112 (e.g. either emptying or filling the buffer) by the data transfer rate of the I/O device 90. That is, the error avoidance module 156 may take into account any additional data bytes that are transferred both into and out of the buffer 112 by the I/O device 90 during the time interval used by the CPU 12 to drain or fill the buffer 112. Nevertheless, a more conservative approach forces an error condition whenever the data transferred with respect to the buffer 112 exceeds the capacity thereof (e.g. no dynamic capacity added).

The error avoidance module 156 may begin by initializing 158 and setting 158 a "transfer count" variable equal to zero. This may be done before any data is transferred into or out of the buffer 112. Additionally, overrun and underrun status flags of the I/O controller 88 may be cleared 160.

A test 162 may then be performed to determine if the operation is a read or a write operation. If the operation is a read operation, then a test 164 may check 164 to see if data is available to be read from the buffer 112. If data is available, then the data may be read 168 from the buffer 112, the "transfer count" may be incremented 172, and the process may cycle back up to the test 162.

If the test 162 determines that the operation is a write operation, then a test 166 may check 166 to determine if data is requested by a device from the buffer 112. If data is requested, then a byte of data may be written from the buffer 112, the "transfer count" may be incremented 172, and the process may cycle back up to the test 162.

However, when data is no longer available 164, in the case of a read operation, or data is no longer requested 166, in the case of a write operation, then the current value of the "transfer count" variable is compared 174 to the capacity of the buffer 112 by a test 174. If the "transfer count" is greater than the capacity of the buffer 112 (or greater than the capacity of the buffer 112 plus a dynamic capacity, as previously discussed), then an error condition is forced 176 by the error avoidance module 156 and the process 157 is complete 178. Conversely, if the "transfer count" is less than the capacity of the buffer 112, than an error condition is not forced and the execution of the error avoidance module 156 is complete 178.

From the above discussion, it will be appreciated that the present invention provides a programmatic time-gap defect correction apparatus and method that avoids errors which may go undetected by a computer system. As a result, buffer underruns or overruns, which may incur errors in data transfers, yet remain undetected and uncorrected in a computer system, are avoided by an error avoidance module in accordance with the invention.

Apparatus and methods in accordance with the present invention may count bytes transferred to and from buffers, used by I/O controllers to temporarily store data while being transferred between synchronous and asynchronous devices, and force an error condition based on the count. If the count exceeds the capacity of the buffer (or the capacity of the buffer plus some dynamic capacity), an error condition may be forced, thereby avoiding conditions that may incur errors into data transfers.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus detecting time-gap defects in a first device communicating with a second device and a third device, the apparatus comprising:
   the first device controlling an exchange of data between the second and third devices, configured to detect errors in the exchange, and having a buffer, characterized by a capacity, to temporarily store the data exchanged, and
   a memory device operably connected to the first device to store data structures of executable and non-executable types, the data structures comprising a detector detecting a time-gap sufficiently long that a data transfer error has occurred, causing data corruption undetected by the first device.

2. The apparatus of claim 1, wherein the first device further comprises a processor programmed to enable the detector.

3. The apparatus of claim 1, wherein the time-gap corresponds to a delay in the exchange, selected from a delay between transfer of consecutive bytes, a delay during transfer of a byte, a delay during transfer of a burst of bytes, a delay between transfer of consecutive bursts of bytes, and an accumulated delay corresponding to a sum of delays accumulated during a plurality of consecutive transfers.

4. The apparatus of claim 1, wherein the time-gap corresponds to at least one delay in the exchange, comprising at least one of a delay between transfer of consecutive bytes, a delay during transfer of a byte, a delay during transfer of a burst of bytes, a delay between transfer of consecutive bursts of bytes, and an accumulated delay corresponding to a sum of delays accumulated during a plurality of consecutive transfers.

5. The apparatus of claim 1, wherein the time-gap is a delay between completions of consecutive transfers.

6. The apparatus of claim 5, wherein the delay corresponds to a time selected from the group consisting of an intra-byte transfer time, an inter-byte transfer time, an intra-burst transfer time, and an inter-burst transfer time.

7. The apparatus of claim 5, wherein the delay is at least one of an intra-byte transfer time, an inter-byte transfer time, an intra burst transfer time, and an inter-burst transfer time between completion of consecutive transfers.

8. The apparatus of claim 5, wherein the delay corresponds to a time between completion of consecutive events selected from the group consisting of a beginning and end of a transfer of a byte, a beginning and end of a time between transfers of consecutive bytes, a beginning and end of a transfer of a burst of bytes, and a beginning and end of an inter-burst transfer time.

9. The apparatus of claim 1, wherein the detector measures the time-gap by counting operations of at least one of a processor, the memory device, the first device, the second device, the third device, a clock, and a bus.

10. The apparatus of claim 1, wherein at least one of the first, second, and third devices is a hardware component of a computing system.

11. The apparatus of claim 10, wherein the hardware component is selected from the group consisting of a bus, controller, processor, memory device, input device, output device, cable, and wire.

12. A method comprising:
identifying a first device controlling an exchange of data between a second device and a third device, the first device configured to detect errors in the exchange and having a buffer, characterized by a capacity, to temporarily store the data exchanged;
initiating a data exchange between the second and third devices;
identifying a time-gap within the data exchange at which data corruption is permitted by the first device without detection by the first device, the time-gap corresponding to a delay in the data exchange, selected from a delay between transfer of consecutive bytes, a delay during transfer of a byte, a delay during transfer of a burst of bytes, a delay between transfer of consecutive bursts of bytes, and an accumulated delay corresponding to a sum of delays accumulated during a plurality of consecutive transfers.

13. A method comprising:
identifying a first device controlling an exchange of data between a second device and a third device, the first device configured to detect errors in the exchange and having a buffer, characterized by a capacity, to temporarily store the data exchanged;
initiating a data exchange between the second and third devices;
identifying a time-gap within the data exchange at which data corruption is permitted by the first device without detection by the first device, the time-gap corresponding to at least one delay in the data exchange, comprising at least one of a delay between transfer of consecutive bytes, a delay during transfer of a byte, a delay during transfer of a burst of bytes, a delay between transfer of consecutive bursts of bytes, and an accumulated delay corresponding to a sum of delays accumulated during a plurality of consecutive transfers.

14. A method comprising:
identifying a first device controlling an exchange of data between a second device and a third device, the first device configured to detect errors in the exchange and having a buffer, characterized by a capacity, to temporarily store the data exchanged;
initiating a data exchange between the second and third devices;
identifying a time-gap within the data exchange at which data corruption is permitted by the first device without detection by the first device, the time-gap being a delay between completions of consecutive transfers.

15. The method of claim 14, wherein the delay corresponds to a time selected from the group consisting of an intra-byte transfer time, an inter-byte transfer time, an intra-burst transfer time, and an inter-burst transfer time.

16. The method of claim 14, wherein the delay is at least one of an intra-byte transfer time, an inter-byte transfer time, an intra burst transfer time, and an inter-burst transfer time between completion of consecutive transfers.

17. The method of claim 14, wherein the delay corresponds to a time between completion of consecutive events selected from the group consisting of a beginning and end of a transfer of a byte, a beginning and end of a time between transfers of consecutive bytes, a beginning and end of a transfer of a burst of bytes, and a beginning and end of an inter-burst transfer time.

18. A method for detecting time-gap defects in a first device communicating with a second device and a third device, the method comprising:
initiating a data transfer between at least one of the first, second, and third devices and a buffer having a capacity;
determining a time-gap within the data transfer at which data corruption is permitted by the first device without detection by the first device, the time-gap corresponding to at least one delay in the data transfer comprising at least one of a delay between transfer of consecutive bytes, a delay during transfer of a byte, a delay during transfer of a burst of bytes, a delay between transfer of consecutive bursts of bytes, and an accumulated delay corresponding to a sum of delays accumulated during a plurality of consecutive transfers.

19. The method of claim 18, wherein:
the data transfer is between the second device and the third device;
the first device controls the data transfer;
the first device comprises a buffer, characterized by a capacity, to temporarily store the data exchanged during the data transfer; and
the first device is configured to detect errors in the data transfer.

* * * * *